United States Patent [19]

Oshida

[11] Patent Number: 4,856,625
[45] Date of Patent: Aug. 15, 1989

[54] CYLINDER TYPE AIR DAMPER WITH FILTER FOR STORAGE BOX

[75] Inventor: Tsutomu Oshida, Yokohama, Japan

[73] Assignee: Nifco Inc., Yokohama, Japan

[21] Appl. No.: 162,662

[22] Filed: Mar. 1, 1988

[30] Foreign Application Priority Data

Mar. 13, 1987 [JP] Japan ................................. 62-56723

[51] Int. Cl.$^4$ ............................ F16F 9/50; E05F 3/00; B01D 39/04; B65D 51/16
[52] U.S. Cl. ........................................ 188/282; 16/66; 55/528; 188/322.17; 220/371; 277/23; 312/327
[58] Field of Search ................ 188/282, 311, 316, 317, 188/322.15, 322.17, 322.22, 281; 267/64.11, 120, 124, 113, 140.1; 16/66, 84; 296/56, 57 R, 57 A, 76, 37.12, 37.9; 137/512; 92/78; 312/327, 326, 329; 224/282; 55/528, DIG. 42; 277/23, 24, DIG. 4–DIG. 6; 220/371, 372

[56] References Cited

U.S. PATENT DOCUMENTS

| 1,543,098 | 6/1925 | Carter et al. | 188/282 |
| 3,071,800 | 1/1963 | Patriquin | 16/66 |
| 3,380,110 | 4/1968 | Daugirdas et al. | 16/66 |
| 4,054,152 | 10/1977 | Ito et al. | 137/512 |
| 4,275,942 | 6/1981 | Steidl | 16/66 X |
| 4,416,445 | 11/1983 | Coad | 267/140.1 X |
| 4,418,799 | 12/1983 | Hart et al. | 188/153 R |
| 4,585,099 | 4/1986 | Taylor | 188/322.17 X |
| 4,617,858 | 10/1986 | Hachiro | 92/99 X |

FOREIGN PATENT DOCUMENTS

| 2722884 | 11/1978 | Fed. Rep. of Germany | 16/66 |
| 0022600 | 9/1970 | Japan . | |
| 0111853 | 7/1986 | Japan . | |

Primary Examiner—Robert J. Oberleitner
Attorney, Agent, or Firm—Richard Bushnell

[57] ABSTRACT

A cylinder type damper device for damping the opening and closing movement of a storage box includes a cylinder member enclosing air therein, an end cap with a filter therein and a rod reciprocally movably inserted into the cylinder member and provided at its front end with a piston for dividing the interior of the cylinder member into a head chamber and a rod chamber. The rod is moved in association with an opening or closing movement of the storage box. The piston has an orifice formed throughout its entire length in the axial direction thereof and being for interchanging air in the head and rod chambers by the axial movement thereof and also has air holes formed likewise throughout its entire length in the axial direction thereof and provided with a check valve for blocking the interchanging of air between the head and rod chambers in accordance with one directional movement in the axial direction of the piston.

2 Claims, 3 Drawing Sheets

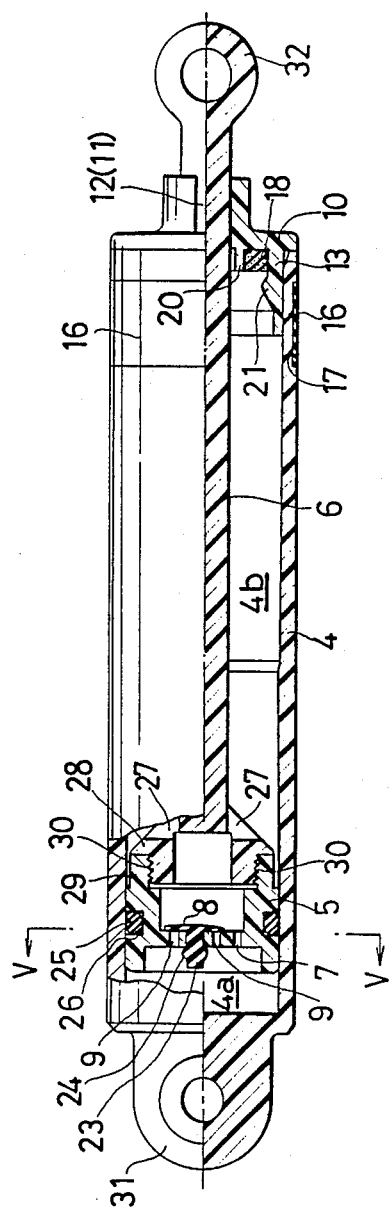
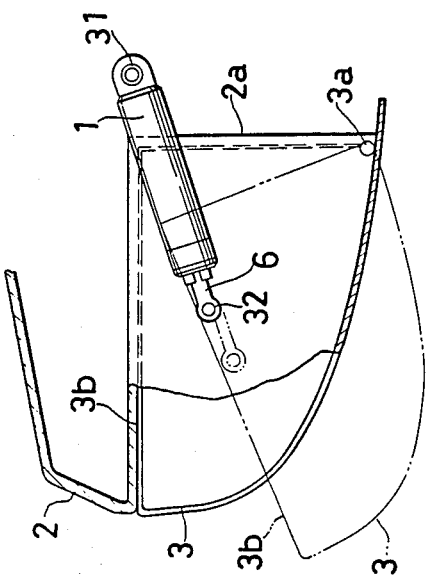
FIG.1
FIG.2

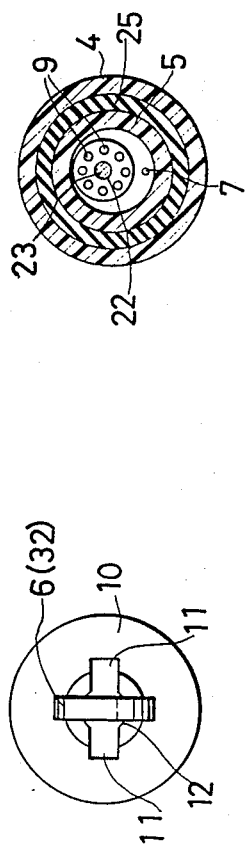
FIG. 5
FIG. 4
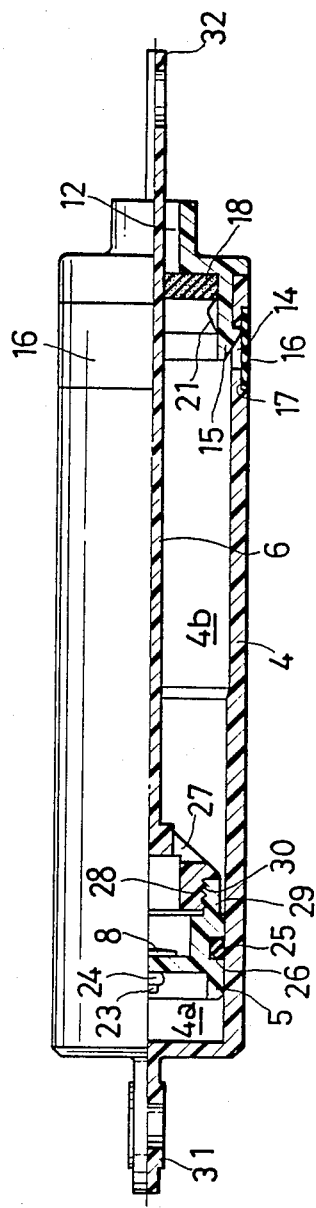
FIG. 6

CYLINDER TYPE AIR DAMPER WITH FILTER FOR STORAGE BOX

BACKGROUND OF THE INVENTION

1. Field of the Invention

This invention relates to a damper device for damping the opening and closing movement of a storage box installed in the interior of a car, and more particularly to a damper device in which a cylinder type air damper is provided with dustproof means.

2. Prior Art Statement

As damper devices for damping the opening and closing movement of a storage box which employ a cylinder type air damper and are installed in a car, there have heretofore been known damper devices for a glove compartments as disclosed, e.g., in Japanese Utility Model Public Disclosure No. Sho 61-11853. Also, as cylinder type air dampers which are provided with dustproof means, there have been known throttle valve devices as disclosed, e.g., in Japanese Utility Model Public Disclosure No. Sho 45-22600.

The first-mentioned damper device for a glove compartment employs a cylinder type air damper. However, its structure is not disclosed specifically.

In the second-mentioned throttle valve device, the cylinder member is threadedly engaged with a throttle screw having a cut-out groove, and the throttle screw is engaged with stationary nut which also serves as a cover for preventing the entrance of dust or the like.

Since the cylinder type air damper itself does not constitute any special feature in the first-mentioned damper device for a glove compartment, it is presumed that the air damper has an ordinary structure. Accordingly, when the glove compartment is opened or closed, especially when opened, a rod thereof is extended. As a result, external air is allowed to enter the cylinder member through a throttle valve. At that time, fine dust or the like floating in the car is drawn into the cylinder member together with air. This is particularly true, when the car is running. When the car is running, dust or the like can easily enter the car through open windows. Once in the car, such dust or the like drifts within the small, closed passenger compartment. Therefore, a large amount of dust or the like is apt to enter the cylinder member. The result is that the damping function is not effectively performed. Because of the foregoing, it is required that some effective means be established in order to prevent dust or the like from entering the cylinder member.

On the other hand, in the second-mentioned throttle valve device, since the stationary nut is formed such that it also acts as a cover, dust or the like is not allowed to accumulate in the space between the stationary nut and the throttle screw. However, since it is still designed such that external air is taken into the cylinder member, it is difficult to prevent the entrance of fine dust or the like included in ambient air into the cylinder member through the periphery of the throttle screw. As seen from the foregoing, the second-mentioned throttle valve device also has a shortcoming in that the damper function is adversely affected by the dust or the like entering the cylinder member.

OBJECT AND SUMMARY OF THE INVENTION

The present invention has been accomplished in order to overcome the aforementioned shortcoming of the prior art. It is therefore the object of the present invention to provide a damper device, which is actuated only by air enclosed in a sealed cylinder chamber in which no dust or the like is allowed to enter, and which therefore, can be reliably and smoothly operated for a long time.

A cylinder type damper device of the present invention comprises a cylinder member enclosing air therein, a rod reciprocally movably inserted into the cylinder member and provided at its front end with a piston for dividing the interior of the cylinder member into a head chamber and a rod chamber, the rod being moved in association with an opening or closing movement of a storage box, an orifice for interchanging air in the head chamber and rod chamber by an axial movement of the piston, and an air hole formed likewise in the piston throughout its entire length in the axial direction thereof and provided with a check valve for blocking the interchanging of air between the head chamber and the rod chamber according to one directional movement in the axial direction of the piston.

If, in the above-mentioned damper device, the check valve is abutted against the piston from the rod chamber side to block the air hole, the internal pressure of the head chamber is reduced during the extending stroke of the rod which is withdrawn from the cylinder member and the internal pressure of the rod chamber is increased. Consequently, the check valve is closed. As a result, since the head chamber and the rod chamber are communicated with each other only through the orifice, air in the rod chamber flows into the opposite head chamber through the orifice. Accordingly, a braking force acts during the extending stroke of the rod.

On the other hand, the internal pressure of the cylinder member is increased during the contracting stroke of the rod which is pushed into the cyiinder member. As a result, the check valve is opened. Thus, since the head chamber and the rod chamber are communicated with each other through the orifice and the air hole, air in the head chamber is discharged into the opposite rod chamber at one time through the orifice. Accordingly, a braking force does not act during the contracting stroke of the rod.

Therefore, if the extending stroke of the rod is associated with the opening action of the storage box and if the contracting stroke of the rod is associated with the closing action of the storage box, only by utilizing air enclosed in the cylinder member and without taking external air into the cylinder member, the braking force acts only when the storage box is opened and as a result, the storage box opens gradually and quietly under its own weight or under its own weight plus the weight of articles stored therein, whereas, when the storage box is closed, the braking force does not act and the storage box can be closed without any extra force.

As described in the foregoing, external air does not enter the cylinder member even if the rod is reciprocally moved within the cylinder member. Accordingly, a smooth operation is ensured over a long time.

The above and other objects and features of the invention will become more apparent from the following detailed description with reference to the accompanying drawings.

BRIEF DESCRIPTION OF THE DRAWINGS

FIG. 1 is a front view, partly in section, showing one embodiment of a damper device according to the present invention;

FIG. 2 is a schematic view showing the damper device of FIG. 1 when in use;

FIG. 4 is a side view of the damper device of FIG. 1.

FIG. 5 is a sectional view taken along V—V of FIG. 1; and

FIG. 6 is a plan view, partly in section, of the damper device of FIG. 1.

DETAILED DESCRIPTION OF THE PREFERRED EMBODIMENT

Figure 3:
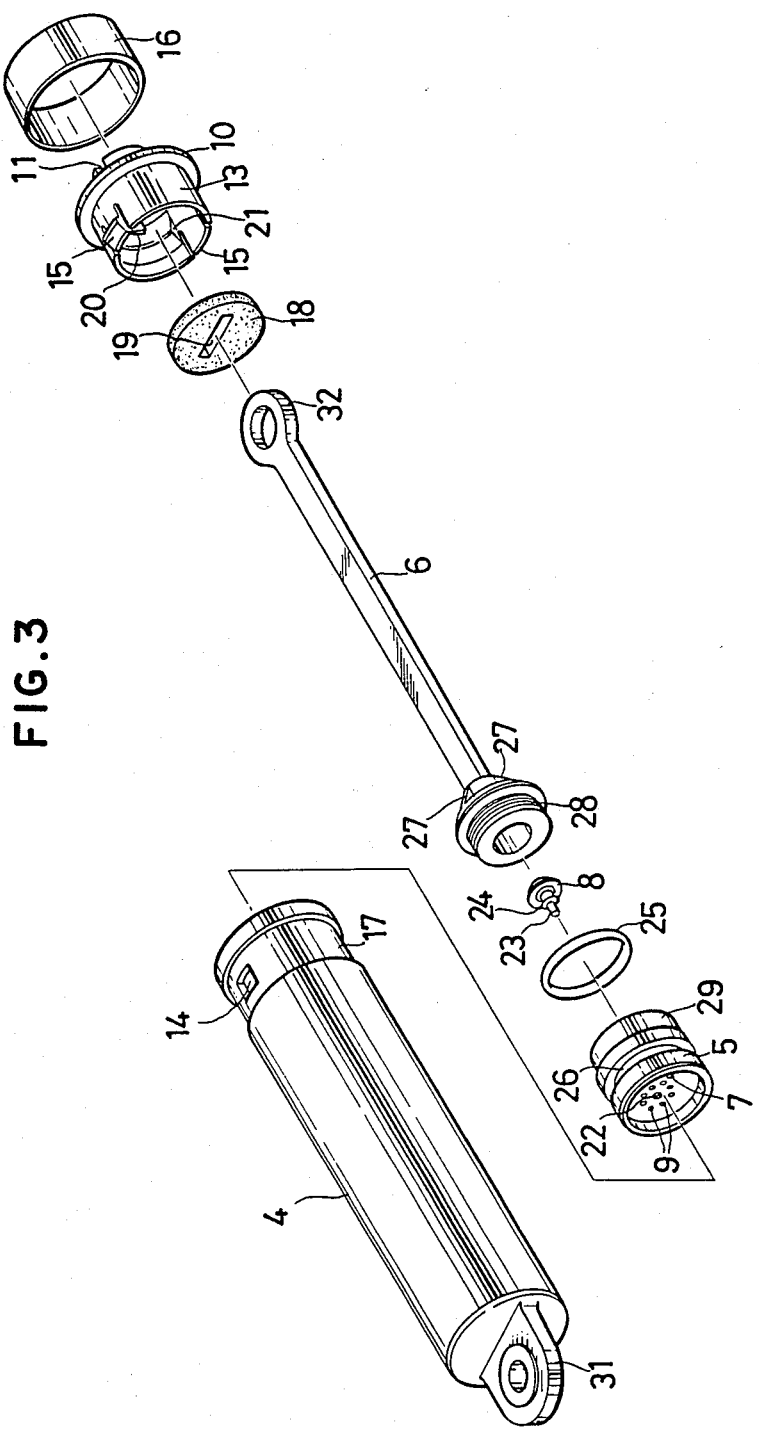
FIG. 3 is an exploded perspective view of the damper device of FIG. 1.

The drawings illustrate one embodiment of a damper device according to the present invention. In the FIGS., 1 denotes a cylinder type air damper which is used in a damper device for braking either opening or closing movement, the opening movement in this embodiment, of a glove compartment (storage box) 3 provided in, for example, an instrument panel 2 as shown in FIG. 2.

As shown in FIG. 3, the air damper 1 comprises a cylinder member 4, a rod 6 reciprocally movably inserted into the cylinder member 4 and provided at its front end with a piston 5 for dividing the interior of the cylinder member 4 into a head chamber 4a and a rod chamber 4b, the rod 6 being moved in association with an opening or closing movement of the storage box 3, an orifice 7 formed in the piston 5 throughout its entire length in its axial direction and being for interchanging air in the head chamber 4a and rod chamber 4b by an axial movement of the piston 5, and an air hole 9 formed likewise in the piston 5 throughout its entire length in the axial direction thereof and provided with a check valve 8 for blocking the interchanging of air between the head chamber 4a and the rod chamber 4b according to one directional movement in the axial direction of the piston 5.

As shown in FIGS. 1 through 6, the cylinder member 4 is formed in a cylindrical shape with one end thereof open. The cylinder member 4 is sealed by fitting a cap 10 to its opening end, as will be explained later. The cylinder member 4 and the cap 10 are made of a plastic material.

As shown in FIGS. 3 and 4, the cap 10 is formed in a cylindrical shape with one end thereof closed, and is provided at its center with an inserting hole 12 having cutouts 11 at opposite sides thereof and cylindrically extending therethrough. For operation, the rod 6 is applied to the cutouts 11, inserted into the inserting hole 12, and then turned by a quarter turn. The outer diameter of an annular marginal portion 13 of the cap 10 is generally coincident with the inner diameter of the cylinder member 4. Further, a hump and a valley engageable with each other are provided between the annular marginal portion 13 and a marginal portion of the opening of the cylinder member 4. In this embodiment, as is shown in FIGS. 3 and 6, the cylinder member 4 is formed in the marginal portion of its opening with rectangular retaining holes 14, whereas the cap 10 is formed on the annular marginal portion 13 with a pair of elastic nails 15 nonreturnably fitted into the retaining holes 14, so that the cap 10 can be attached to the cylinder member 4 with one touch.

In FIG. 3, 16 denotes a rubber cap fitted to the outer peripheral surface of the end portion of the opening of the cylinder member 4 and blocking the retaining holes 14. In this embodiment, the cylinder member 4 is formed with an annular recess 17 having a depth generally equal to the thickness of the rubber cap 16 in the periphery of the end portion of its opening, and the annular recess 17 is fitted in the rubber cap 16 for sealing (FIG. 6).

Furthermore, in FIG. 3, 18 denotes a spongy filter sheet made of synthetic resin or rubber and mounted in the cap 10. The filter sheet 18 is formed with a linearly elongated opening 19 for allowing the rod 6 to pass therethrough. The filter sheet 18 is adopted in order to filter dust or the like included in any small amount of air which enters the cylinder member 4 through the space between the inserting hole 12 and cut-outs 11 of the cap 10 and the rod 6.

As shown in FIG. 1, the cap 10 is provided with a pair of arm portions 20 projecting from its inner surface and caught by both ends of the elongated opening 19 formed in the filter sheet 18. Further, the cap 10 is provided with opposite annular projections 21 projecting from the inner peripheral surface of the annular marginal portion 13 at a space generally equal to the thickness of the filter sheet 18, so that the filter sheet 18 can be held on the inner side of the cap 10.

As shown in FIG. 5, the piston 5 is formed at an eccentric position with respect to its axis with a tiny orifice 7 communicating with the aforementioned chambers 4a and 4b. The piston 5 is further provided at an eccentric position on the other side thereof with a through-hole 22 for mounting the check valve 8 therein. The piston 5 is further formed with a plurality of air holes 9 arranged at spaces in its circumferential direction around the mounting through-hole 22. The check valve 8 is made of a rubber material and formed in a generally umbrella shape having a stem portion 23. The check valve 8 is provided at a lengthwise intermediate part of the stem portion 23 thereof with an expanded portion 24 having a larger diameter than that of the mounting through-hole 22 and adapted to prevent the check valve 8 from coming off. In FIG. 3, 25 denotes an O ring fitted into an annular groove 26 formed in the outer peripheral surface of the piston 5. The rod 6 integrally supports a threaded barrel 28 by a plurality of radial leg portions 27 extending forwardly at angles from its front end in such a manner as to be spaced apart from its front end. The inner hole of the threaded barrel 28 is open to the outside through spaces between the adjacent leg portions 27. And, the threaded barrel 28 can be integrally connected with the piston 5 by screwing the threaded barrel 28 into a thread portion 30 formed on the inner periphery of an annular rear portion 29 of the piston 5. The rod 6 and the piston 5 may be separately formed of a plastic material. Of course, the rod 6 may be integrally formed with the piston 5 in such a manner as to project from the rear end of the piston 5.

The operation of the air damper 1 will be described next. The cylinder 4 has air sealed therein. During the extending stroke of the rod 6, i.e., during the rightward movement of the rod in FIG. 1, the internal pressure of the head chamber 4a located at the left side within the piston 5 is reduced and the internal pressure of the rod chamber 4b is increased. As a result, the check valve 8 is closed. Thus, since the chambers 4a and 4b are communicated with each other only through the orifice 7, air in the rod chamber 4b located at the right side flows into the opposite head chamber 4a through the threaded barrel 28, piston 5 and orifice 7. Therefore, a braking force acts on the movement of the piston 5 in the extending direction.

On the other hand, during the contracting stroke of the rod 6, i.e., during the leftward movement of the rod 6 in FIG. 1, the internal pressure of the head chamber 4a within the piston 5 is reduced. As a result, the check valve 8 is opened. Thus, since the chambers 4a and 4b are communicated with each other also through the air holes 9, air in the head chamber 4a is discharged into the opposite rod chamber 4b through the orifice 7, air holes 9, piston 5 and threaded barrel 28 all at one time. Therefore, no braking force acts on the movement of the piston 5 in the contracting direction and the piston 5 therefore moves smoothly.

FIG. 2 illustrates one example in which the air damper 1 is employed in a damper device for the glove compartment 3.

The glove compartment 3 is pivotally attached to both side walls forming a housing 2a in such a manner that it can be freely opened and closed, at least the lower surface of the housing 2a being open, the housing 2a being provided in the instrument panel 2 in a car. Normally, the open upper surface 3b of the glove compartment 3 is retained in a closing position facing the lower surface of the upper wall of the housing 2a by a locking device (not shown). When the locking device is pushed, for example, the glove compartment 3 turns downward at angles about its pivot shaft 3a and opens under its own weight plus the weight of articles stored therein so that the articles can be taken out or put in through the open upper surface 3b.

And, a mounting piece 31 projecting from the head end of the cylinder member 4 of the air damper 1 is pivotally attached to the side walls forming the housing 2a, whereas an annular ring portion 32 at the front end of the rod 6 is pivotally attached to the side surface of the glove compartment 3.

Accordingly, when the glove compartment 3 is opened, since the rod 6 is moved in the extending direction thereof, a braking force acts thereon. As a result, the glove compartment 3 gradually and quietly opens.

On the other hand, when the glove compartment 3 is closed, since the rod 6 is moved in the contracting direction thereof, no braking force acts thereon. As a result, the glove compartment 3 can be lightly and speedily closed simply by pushing it up by hand and without any extra force.

In the illustrated embodiment, the cylinder member 4 of the air damper 1 is pivotally attached to the housing 2a side. The cylinder member 4 may of course be pivotally attached to the glove compartment 3 side together with the rod 6. Although the rod 6 is directly pivotally attached to the side surface of the glove compartment 3, a transmitting mechanism for converting an annular opening and closing movement of the glove compartment 3 into a linear extending and contracting movement of the rod 6 may be interposed between the rod 6 and the side surface of the glove compartment 3.

On the other hand, by increasing the sealing performance of the rod chamber 4b acting on the right side of the piston 5 and by mounting the check valve 8 in the opposite direction, it is possible to actuate the braking force during the contracting stroke of the piston 5.

As described in the foregoing, according to the present invention, since air enclosed in the cylinder member can be interchanged between two chambers within the cylinder member, fine dust or the like floating in the car is substantially prevented from entering the piston. Therefore, there can be provided a damper device for a storage box which can be reliably and smoothly operated over a long time.

What is claimed is:

1. A cylinder type damper device for braking one direction of movement of a storage box which is openable and closable with respect to a housing, said damper device comprising:
   a cylinder member enclosing air therein and having an open end substantially sealed by a cylindrical cap member; and
   a rod reciprocally movably inserted into said cylinder member and provided at its front end with a piston for dividing the interior of said cylinder member into a head chamber and a rod chamber, said rod being moved in association with an opening and closing movement of said storage box;
   said piston including an orifice formed throughout its entire length in the axial direction thereof for interchanging air in said head chamber and rod chamber by an axial movement of said piston, and air holes formed likewise throughout its entire length in the axial direction thereof and provided with a check valve for blocking the interchanging of air between said head chamber and said rod chamber according to one directional movement in the axial direction of said piston; and
   said cap having an inserting hole for receiving said rod and a filter mounted in said cap, said filter having a preformed opening for receiving said rod and being adapted to filter any external air which may enter said cylinder through said hole in said cap, and said cap having arm portions projecting into opposite ends of said preformed opening in said filter and at opposite sides of said rod.

2. The damper device of claim 1, wherein said cylinder member is provided at its head end with means for mounting to said housing and a rear end of said rod with connecting means of said storage box.

* * * * *